US006170618B1

(12) United States Patent
Rueckert

(10) Patent No.: US 6,170,618 B1
(45) Date of Patent: Jan. 9, 2001

(54) BRAKE SHOE WITH RETAINING SPRING LOCKED AGAINST ROTATION

(75) Inventor: Helmut Rueckert, Reinheim (DE)

(73) Assignee: ITT Automotive Europe GmbH, Frankfurt (DE)

(*) Notice: Under 35 U.S.C. 154(b), the term of this patent shall be extended for 0 days.

(21) Appl. No.: 08/766,847

(22) Filed: Dec. 13, 1996

Related U.S. Application Data

(62) Continuation of application No. 08/649,425, filed on May 16, 1996, now abandoned, which is a continuation of application No. 08/240,666, filed as application No. PCT/EP92/02168 on Sep. 19, 1992, now abandoned.

(30) Foreign Application Priority Data

Nov. 2, 1991 (DE) .................................. 41 36 107

(51) Int. Cl.[7] ............................. F16D 65/38; F16D 65/84
(52) U.S. Cl. ...................... 188/73.37; 29/509; 29/522.1; 188/250 E
(58) Field of Search ................. 188/73.1, 73.31, 188/73.32, 73.33, 73.34, 73.35, 73.36, 73.37, 73.38, 73.39, 73.43, 250 E, 250 G, 258, 370; 29/509, 522.1

(56) References Cited

U.S. PATENT DOCUMENTS

| 1,491,230 | * | 4/1924 | Gray .................. 29/522.1 X |
| 2,746,142 | * | 5/1956 | Maxwell ................ 29/522.1 |
| 3,769,676 | * | 11/1973 | Feller ................. 29/522.1 X |
| 4,313,527 | | 2/1982 | Pickel .................. 188/73.32 |
| 4,597,365 | * | 7/1986 | Madaffer ............. 29/522.1 X |
| 4,609,077 | | 9/1986 | Nakatsuhara ......... 188/73.38 |

FOREIGN PATENT DOCUMENTS

| 9 000 489 | 5/1990 | (DE) . |
| 3 842 428 | 6/1990 | (DE) . |
| 0 112 255 | 6/1984 | (EP) . |
| 0 311 239 | 4/1989 | (EP) . |
| 0 440 041 | 8/1991 | (EP) . |
| 2 147 376 | 5/1985 | (GB) . |
| 61-266838 | 11/1986 | (JP) . |
| 92/13210 | 8/1992 | (WO) . |

OTHER PUBLICATIONS

Frederico Strasser, "Verbinden von stangenformigen Werkstucken mit Blechteilen," *Wekstatt und Betrieb*, at pp. 917–919 (1963).
Helmut Pitz, "Verbindungen von Lageraugen mit Blechwanden," *Der Maschinenbau*, at pp. 173, 174 (1956).
Von H. Eder, "Feinwerktechnische Verbindungen durch plastisches Verformen," *Feinwerktechnik*, at pp. 135–152 (1961).
W. Schoch, "Rationalisierung durch Taumel–Kaltverformung," *technica*, at pp. 365–367 (May 1981).
U.S. patent application marked PCT 7121, Corresponds to WO 92/13210, Aug. 6, 1992.

* cited by examiner

Primary Examiner—Matthew C. Graham
(74) Attorney, Agent, or Firm—Ratner & Prestia

(57) ABSTRACT

A brake shoe for disc brakes comprises a pad back plate which, on a first face thereof, is provided with a friction pad and, on a second face thereof, has a projection to which a retaining spring is fixed to prevent rotation of the retaining spring relative to the pad back plate. The projection extends through a non-circular opening in the retaining spring and comes into intimate contact with the opening when deformed radially by the application of an axial force to the projection to produce a form-lock which prevents the retaining spring from rotating relative to the pad back plate.

13 Claims, 2 Drawing Sheets

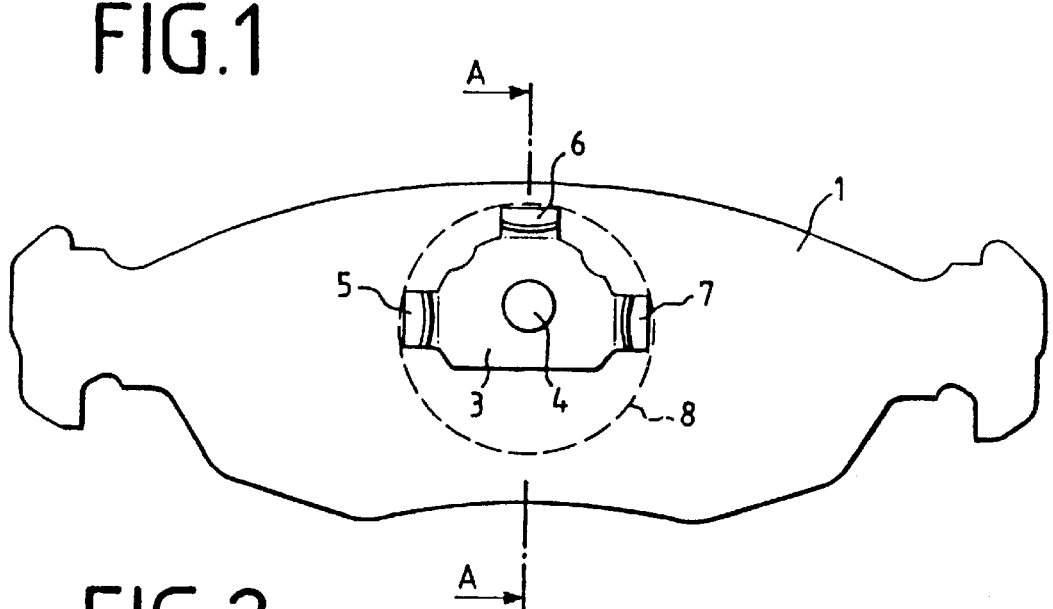
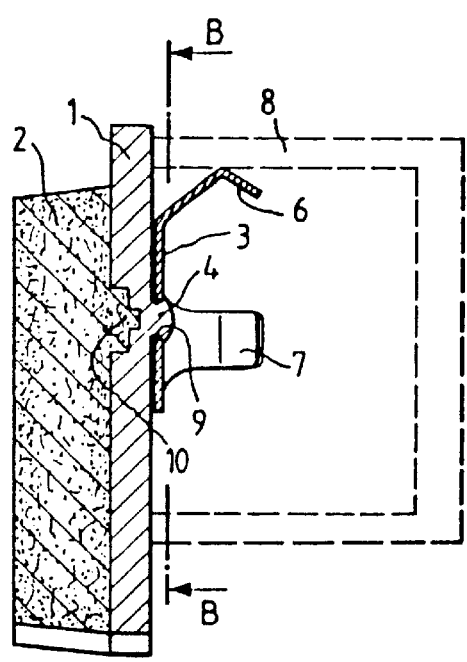
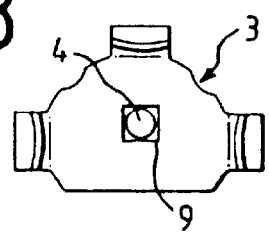
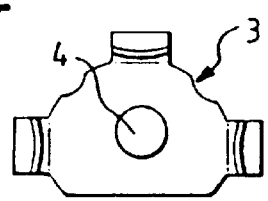
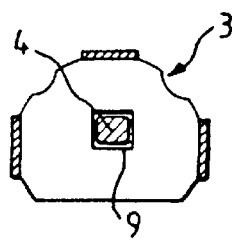

BRAKE SHOE WITH RETAINING SPRING LOCKED AGAINST ROTATION

This application is a continuation of application Ser. No. 08/649,425 filed May 16, 1996 now abandoned.

This application is a continuation of application Ser. No. 08/240,666 filed Apr. 29, 1994 now abandoned which is a 371 of PCT/EP92/02168 Sep. 19, 1992.

BACKGROUND OF THE INVENTION

The present invention relates to (a) a brake shoe for disc brakes having a retaining spring which is fixed to the pad back plate and is locked to prevent rotation thereof, and (b) a process for manufacturing such a brake shoe.

DE-OS 3842428 discloses a brake shoe of the afore-described type which is intended for use with a floating caliper spot-type disc brake. When assembled, the brake shoe, with its pad back plate, is in abutment with a brake piston of a hydraulic actuator. During braking, the brake piston acts directly upon the brake shoe, thereby forcing it against the brake disc. After the braking operation, the brake piston, in known manner, is withdrawn, by means of a roll-back sealing ring, a short distance opposite the actuating direction in order to set a clearance between the friction face of the brake shoe and the brake disc. To insure that the brake shoe follows that movement, it is clamped on the brake piston by means of a retaining spring. The retaining spring comprises three tongues which engage the hollow brake piston. One of the tongues, at the same time, serves to prestress the brake shoe vis-à-vis the brake housing to prevent the brake shoe from clattering in its guides, with the brake shoe being radially forced toward the brake disc axis. To safeguard this function, the retaining spring is fixed to the pad back plate in a predetermined position and is prevented from rotating during operation.

In the conventional brake pad, the retaining spring, in simple manner, is fixed by a single bolt or pin forced into the pad back plate. To prevent the retainer spring from rotating about the bolt, provision has been made for connecting the retaining spring, in form-locking manner, with a damping sheet which also is fixed to the pad back plate. However, this way of locking against rotation is not suitable for use with brake shoes not provided with a damping sheet.

Another means of fixation for locking against rotation of the retaining spring is disclosed by EP 0112255 B1 in which the pad back plate is provided with a molded, punched-through projection, having a D-shaped cross-section, protruding beyond the plate plane. The retaining spring is provided with a D-shaped hole for passage of the punched-through projection, with the form-locking connection preventing rotation of the retaining spring about the single point of fixation from occurring. The fixation is by riveting of the punched-through projection, for example, by wobble riveting.

However, this type of fixation has the disadvantage that strong forces are required for caulking or wobbling to deform the required material volume. In view of unavoidable manufacturing tolerances, the retaining spring, as such, or the pad back plate are likely to be bent so that the proper function of the brake shoe no longer is safeguarded.

SUMMARY OF THE INVENTION

It is, therefore, an object of the present invention to provide an improved brake shoe, wherein the retaining spring, in simple manner, is fixed to the pad back plate and is locked against rotation. Moreover, an improved process for fixing a retaining spring to a brake shoe of the type disclosed by the present invention is to be provided which is insensitive to manufacturing tolerances.

Basically, the solution resides in that a projection of the pad back plate, provided for fixing the retaining spring, is made to conform to the shape of a hole of the retaining spring, provided for the passage of the projection, only during riveting of the projection. The hole is of a non-circular (e.g. oval or angular) configuration; in any case, it is designed such that the retaining spring is unable to rotate about the projection which fills the hole in the retaining spring.

When designing the brake shoe, the projection is molded to the pad back plate, protruding from the plate plane and, in cross-section, initially, has a maximum cross-sectional dimension which permits passage of the projection through the hole. After assembly of the retaining spring and the projection, the material of the projection, through caulking or wobbling, is laterally forced against the edges of the hole, with the cross-section of the projection automatically conforming to the shape of the hole, thereby establishing a form-locking, anti-rotation connection between retaining spring and brake pad.

In the brake pad designed in accordance with the present invention, substantially lower forces are required for wobbling the projection than are required by the state-of-the-art systems. This is due to the fact that the projection, initially, is of a relatively small diameter so that a relatively small amount of material is to be deformed during wobbling. Conversely, in a conventional system as disclosed, for example, by EP 0112255 B1, the projection, with its D-shaped cross-section, already prior to wobbling, fills up, in form-locking manner, the D-shaped hole of the retaining spring. Hence, with the given dimensions of the hole, it is relatively thick so that correspondingly strong forces are required for wobbling.

In practice, in a brake shoe of the type as provided by the present invention, the force required for wobbling can be reduced to half the amount required by arrangements of conventional design of comparable dimensions. This, among others, involves the advantage that the likelihood of changes in dimension, such as bulging of the retaining spring or of the pad back plate during manufacturing of the brake shoe, is notably reduced and the yield of high-quality brake shoes increased. Equally, the wobble angle and the time required for wobbling are reduced. A lower cyclical time, during manufacture, also results in the benefit that more economical means of production can be used. A small wobble angle is advantageous in unfavorable space conditions, for example, in cases where retaining springs, having closely spaced spring tongues for engagement with small brake pistons of small inside diameters, are to be fixed. In addition, the process of manufacture according to the present invention, as regards wobbling force and wobbling time, permits high tolerances, thereby insuring a high degree of reliability in the manufacturing process. Another advantage arises from the fact that the shape of the projection is adapted to the shape of the hole of the retaining spring only during wobbling, with dimension tolerances, due to technical manufacturing conditions, being automatically compensated. Finally, experience has shown that the quality of a fixation point according to the present invention, in view of its improved outward appearance, by a simple sight check, can be more reliably assessed and monitored than has hitherto been possible.

In accordance with the present invention, the various shapes of the hole in the retaining spring are easy to manufacture and reliably lock the retaining spring against rotation. A particularly preferred embodiment of the present invention is to form the retaining spring with a square hole.

A projection of circular cross-section, in view of its simple shaping, is easy to manufacture and, during wobbling, readily conforms to the shaping of the hole, in particular, in connection with a square hole. In this context, the combination of a circular projection having a diameter of 5 mm and a square hole in the retaining spring having a side length of 5.2 mm has turned out to be optimum. With these shapes and dimensions, a force of 4500 N for wobbling can be used. The projection, as such, preferably is molded to the pad back plate by means of a plunger.

BRIEF DESCRIPTION OF THE DRAWING

Some embodiments of the present invention will be described in greater detail with reference to the drawing, wherein:

FIG. 1 is a plan view of the rear side of a brake shoe according to the present invention;

FIG. 2 is a sectional view taken along line A—A of FIG. 1;

FIG. 3 is a partial view of a brake shoe according to the present invention prior to riveting of the retaining spring;

FIG. 4 is a partial view, generally similar to FIG. 3, after riveting of the retaining spring;

FIG. 5 is a partial, sectional view taken along line B—B of FIG. 2, after riveting of the retaining spring;

DETAILED DESCRIPTION OF THE INVENTION

Figure 6A:
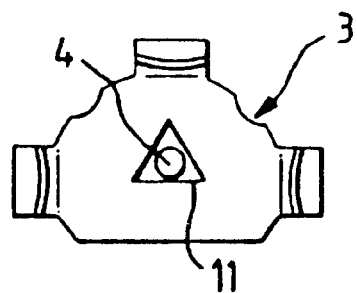
FIGS. 6a–6d are partial views, generally similar to FIG. 3, with alternative shapings of the hole of the retaining spring: a) triangular; b) octagonal; c) oval; d) D-shaped.

The brake shoe shown in FIGS. 1 and 2 is composed of a pad back plate 1 which, on one face thereof, is provided with a friction pad 2 and, on the other opposite face, with a retaining spring 3 made of spring sheet. For fixing the retaining spring 3, a projection 4 is provided which is molded to the pad back plate 1 and extends from the plane of the plate. The retaining spring 3 comprises three spring arms 5, 6, 7 for engagement with a hollow brake piston 8 shown by the broken lines.

As shown in FIG. 5, the central section of the retaining spring 3 has a square opening 9 through which projection 4 extends axially. Projection 4 fills opening 9 in form-locking manner so that the retaining spring 9 is unable to rotate about the point of attachment. At the same time, the projection 4 extends laterally beyond the edges of the opening 9, as shown in FIG. 2, to force the retaining spring 3 against the pad back plate 1, thereby safely fixing the retaining spring 3 to the pad back plate 1. The retaining spring 3 is formed from a piece of spring sheet. It is produced by punching and bending, and, during the same operation, forming the square opening 9.

In the manufacture of the brake shoe, projection 4 and pad back plate 1 preferably are a unitary component. Prior to applying the friction pad 2, the projection 4 is molded to the pad back plate 1 by a plunger which acts on the face of the pad back plate 1 provided for the friction pad 2, punching through the projection 4 to cause it to extend from the other face of the pad back plate 1. The plunger generates the impression 10 which, during application of the friction pad 2, is filled with friction material. As shown in FIG. 3, the cross-section of projection 9, after molding but prior to fixing of the retaining spring 3, initially is circular and of a diameter smaller than the smallest width (side length) of the square opening 9 of the retaining spring 3.

For fixation to the pad back plate 1, the retainer spring 3, with its opening 9, is pushed onto the projection 4 and is placed into the proper angular position. This is shown in FIG. 3. Subsequently, the projection 4 is wobbled (riveted) by an axial force so that, as shown in FIG. 4, it laterally deforms, in broadened condition, beyond the edges of the opening 9 to force the retaining spring 3 against the pad back plate 1. However, during wobbling, the section of projection 4 extending axially through the opening 9 also is deformed radially as shown in the cross-sectional view of FIG. 5. The cross-section of projection 4 broadens until it is in intimate contact with the edges of the opening 9 to conform to the square shape of the opening 9. In this manner, a form-lock is generated between the retaining spring 3 and the projection 4 which prevents the retaining spring 3 from rotating relative to the pad back plate 1. According to a preferred design of the first embodiment of the present invention, as shown in FIGS. 1 through 5, the original circular cross-section of the projection 4 has a diameter of 5 mm, and the square opening 9 has a side length of 5.2 mm. For wobbling, a force of 4500 N is employed.

Figure 6B:
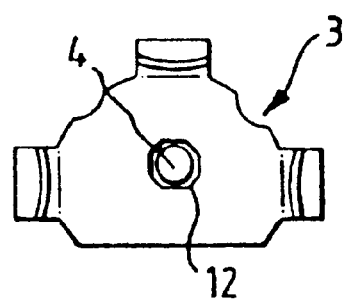
Figure 6C:
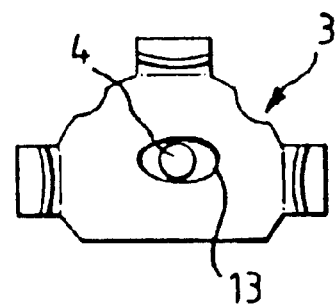
Figure 6D:
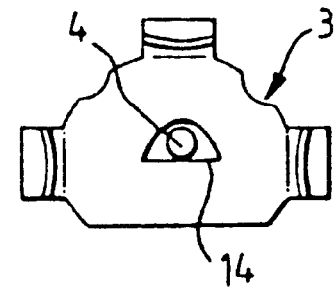

FIGS. 6a through 6d show additional examples of retaining springs 3 designed according to the present invention. Each of the retaining springs 3 is shown already pushed onto a projection 4 of circular cross-section of the pad back plate 1 (not shown). The conditions illustrated by FIGS. 6a through 6d correspond to the one shown by FIG. 3 wherein the projection 4 is not yet wobbled. After wobbling, the respective openings 11, 12, 13, 14 of the deformed projections 4 are substantially filled and covered so that the external triangular, polygonal, oval or D-shaped configurations no longer are seen. However, in the interior of the openings 11, 12, 13, 14, the respective projection 4, similar to what is shown by FIG. 5, is deformed such that it substantially conforms to the shape of the associated opening 11, 12, 13, 14 and conforms, in a form-locking manner, to the edges of the associated opening.

What is claimed is:

1. A method of manufacturing a brake shoe, characterized by the following process steps:
   providing a retaining spring of spring sheet to be fixed to a pad back plate with square opening;
   molding a projection to the pad back plate, which projection:
   (a) protrudes from the plate plane;
   (b) has an initial cross-sectional shape different from the cross-sectional shape of the opening of the retaining spring; and
   (c) has a diameter which is smaller than the side length of the opening of the retaining spring;
   placing the retaining spring on the pad back plate such that the projection protrudes through the opening; and
   caulking or wobbling the projection until it substantially conforms, in form-locking manner, to the edges of the opening.

2. A process according to claim 1, characterized in that the projection of the pad back plate is of a circular cross-section of a diameter of 5 mm.

3. A process according to claim 2, characterized in that the side length of the opening of the retaining spring is 5.2 mm.

4. A process according to claim 3, characterized in that the projection is wobbled at a force of about 4500 N.

5. A process according to claim 4, characterized in that the pad back plate has a first side facing the retaining spring and a second side facing away from the retaining spring and the projection is molded by means of a plunger acting upon the second side of the pad back plate, and punching through the projection.

6. A method of manufacturing a brake shoe comprising the steps of:

providing a retaining spring of spring sheet having a square opening;

providing a pad back plate having:
(a) a friction pad on a first face of said pad back plate, and
(b) a projection extending from a second face of said pad back plate opposite from said first face of said pad back plate and having a length greater than the thickness of said retaining spring and a cross-sectional shape which is initially different from the cross-sectional shape of said opening and which permits said projection to pass through said opening in said retaining spring;

placing said retaining spring against said second face of said pad back plate with said projection extending through said opening in said retaining spring;

and deforming said projection radially by applying an axial force to said projection to bring said projection substantially into intimate contact with said opening in said retaining spring.

7. A method according to claim 6 wherein, during said deforming step, said projection is deformed laterally to extend over said retaining spring beyond said opening in said retaining spring.

8. A method according to claim 6 wherein the diameter of said projection of said pad back plate prior to deformation is 5 mm.

9. A method according to claim 8 wherein said opening in said retaining spring has a square configuration having a side length of 5.2 mm.

10. A method according to claim 9 wherein said axial force applied to said projection is approximately 4500 N.

11. A method according to claim 7 further including the step of rotating said retaining spring about said projection into a desired position prior to said step of deforming.

12. A method according to claim 7 further including the step of applying a plunger to said first face of said pad back plate to mold said projection as part of said pad back plate.

13. A method according to claim 6, wherein said projection has a diameter which is smaller than the side length of said opening of said retaining spring.

* * * * *